US011972682B2

(12) United States Patent
Mene et al.

(10) Patent No.: US 11,972,682 B2
(45) Date of Patent: Apr. 30, 2024

(54) DISPLAYING VEHICLE INFORMATION TO A PEDESTRIAN USING A VISUAL INDICATOR

(71) Applicant: International Business Machines Corporation, Armonk, NY (US)

(72) Inventors: Atul Mene, Morrisville, NC (US); Tushar Agrawal, West Fargo, ND (US); Jeremy R. Fox, Georgetown, TX (US); Sarbajit K. Rakshit, Kolkata (IN); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/933,107

(22) Filed: Sep. 18, 2022

(65) Prior Publication Data

US 2024/0096208 A1 Mar. 21, 2024

(51) Int. Cl.
*G08G 1/005* (2006.01)
*G08G 1/16* (2006.01)

(52) U.S. Cl.
CPC ............. *G08G 1/005* (2013.01); *G08G 1/166* (2013.01)

(58) Field of Classification Search
CPC ............................... G08G 1/005; G08G 1/166
See application file for complete search history.

(56) References Cited

U.S. PATENT DOCUMENTS 8,903,593 B1 12/2014 Addepalli et al.
10,223,134 B1 3/2019 Penilla et al.
10,363,869 B2 7/2019 Vincent et al.
10,558,264 B1 * 2/2020 Watson ................ H04N 13/156
10,769,525 B2 9/2020 Redding et al.
10,816,973 B2 10/2020 Jiang et al.
11,120,279 B2 9/2021 Saez et al.
2010/0121480 A1 5/2010 Stelzer et al.
2011/0154233 A1 * 6/2011 Lamarca ............... G06F 3/0425 715/764
2016/0198306 A1 7/2016 Miles et al.
2017/0082447 A1 3/2017 Ricci
2017/0124867 A1 * 5/2017 Paruch ..................... G08G 1/01
2019/0035270 A1 * 1/2019 Astigarraga ..... G08G 1/096783

(Continued)

FOREIGN PATENT DOCUMENTS

CN 109070891 B 1/2020
DE 102019116357 A1 12/2020

OTHER PUBLICATIONS

Anonymous, "Method and System for Dynamically Altering Action Strategy of an Autonomous Vehicle Based on a User's Reactions to Contextual Situations", an IP.com Prior Art Database Technical Dislocusre, IP.Com No. IPCOM000260329D, Nov. 12, 2019, 6 pgs.

(Continued)

*Primary Examiner* — Omer S Khan
(74) *Attorney, Agent, or Firm* — Peter Suchecki

(57) ABSTRACT

Provided is a computer-implemented method, system, and computer program product for displaying information to a pedestrian using a visual indicator. A processor may detect that a vehicle is approaching a pedestrian. The processor may determine that the pedestrian is unable to see the approaching vehicle. The processor may display an indication that the vehicle is approaching the pedestrian on an object the pedestrian can currently view.

16 Claims, 6 Drawing Sheets

(56) References Cited

U.S. PATENT DOCUMENTS

| | | | |
|---|---|---|---|
| 2019/0106052 A1 | 4/2019 | Delgado | |
| 2019/0135306 A1 | 5/2019 | Won | |
| 2020/0114928 A1 | 4/2020 | Heath et al. | |
| 2020/0189614 A1* | 6/2020 | Ito | B60W 30/0956 |
| 2020/0380273 A1* | 12/2020 | Saez | G06V 10/85 |
| 2021/0202067 A1 | 7/2021 | Williams et al. | |
| 2022/0012988 A1 | 1/2022 | Avadhanam et al. | |
| 2022/0172626 A1* | 6/2022 | Baik | G06V 40/103 |

OTHER PUBLICATIONS

Anonymous, "Dynamic Creation of Secure Pedestrian Crossings based on AV Collaboration", an IP.com Prior Art Database Technical Disclosure, IP.com No. IPCOM000266356D, Jul. 7, 2021, 5 pgs.

Ford, "What is the Ford Driver Alert System?" https://www.ford.com/support/how-tos/ford-technology/driver-assist-features/what-is-the-driver-alert-system/, printed Jun. 15, 2022, 3 pgs.

Honda, "Driver Attention Monitor," https://owners.honda.com/vehicles/information/2017/CR-V/features/Driver-Attention-Monitor/1/driver-attention-monitor-pdf, printed Jun. 15, 2022, 1 pg.

IBM, "IBM IoT Connected Vehicle Insights—Overview," https://www.ibm.com/products/iot-for-automotive, printed Jun. 15, 2022, 2 pgs.

Qualcomm, "Why C-V2X technology is the safety solution pedestrians need," https://www.qualcomm.com/news/pnq/2021/10/why-c-v2x-technology-safety-solution-pedestrians-need, Oct. 12, 2021, 6 pgs.

Rubin, B., "Qualcomm seeks to save lives with new C-V2X driver warning system," https://www.cnet.com/roadshow/hews/qualcomm-seeks-to-save-lives-with-new-c-v2x-driver-warning-system/, printed Jun. 15, 2022, 2 pgs.

Ryu, M., "Context_awareness based Driving Assistance System for Autonomous Vehicles," https://www.researchgate.net/publication/323040919_Context-Awareness_based_Driving_Assistance_System_for_Autonomous_Vehicles, International Journal and Automation, vol. 11, No. 1 (2018), pp. 153-162.

Springer, J., "Connectivity Standards in the Automotive Industry," https://www.itu.int/en/ITU-T/extcoop/cits/Documents/Meeting-20191028-e-meeting/18_5GAA_ITS-status-update.pdf, May 2019, 41 pgs.

Volvo, "Driver Alert Control," https://www.volvocars.com/in/support/manuals/xc90/2020w46/driver-support/driver-alert-control/driver-alert-control, printed Jun. 15, 2022, 5 pgs.

Wada et al., "Real-time Detection System for Smartphone Zombie Based on Machine Learning," https://www.jstage.st.go.jp/article/comex/advpub/0/advpub_2020XBL0025/_pdf/-char/ja, IEICE Communications Express 2020, vol. 1, 1-6.

* cited by examiner

DISPLAYING VEHICLE INFORMATION TO A PEDESTRIAN USING A VISUAL INDICATOR

BACKGROUND

The present disclosure relates generally to the field of vehicle safety technology and, more specifically, to displaying vehicle information to a pedestrian using a visual indicator.

Vehicles (e.g., autonomous and/or manually driven vehicles) can detect various obstacles within their path from a long distance away and can adjust, through a driving decision, for both objects that are stationary and/or moving objects. For example, a vehicle may adjust its speed (e.g., slow or stop) or direction while driving on a road based on the presence of a pedestrian in proximity to the vehicle.

SUMMARY

Embodiments of the present disclosure include a computer-implemented method, system, and computer program product for displaying information to a pedestrian using a visual indicator. A processor may detect that a vehicle is approaching a pedestrian. The processor may determine that the pedestrian is unable to see the approaching vehicle. The processor may display an indication that the vehicle is approaching the pedestrian on an object the pedestrian can currently view.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
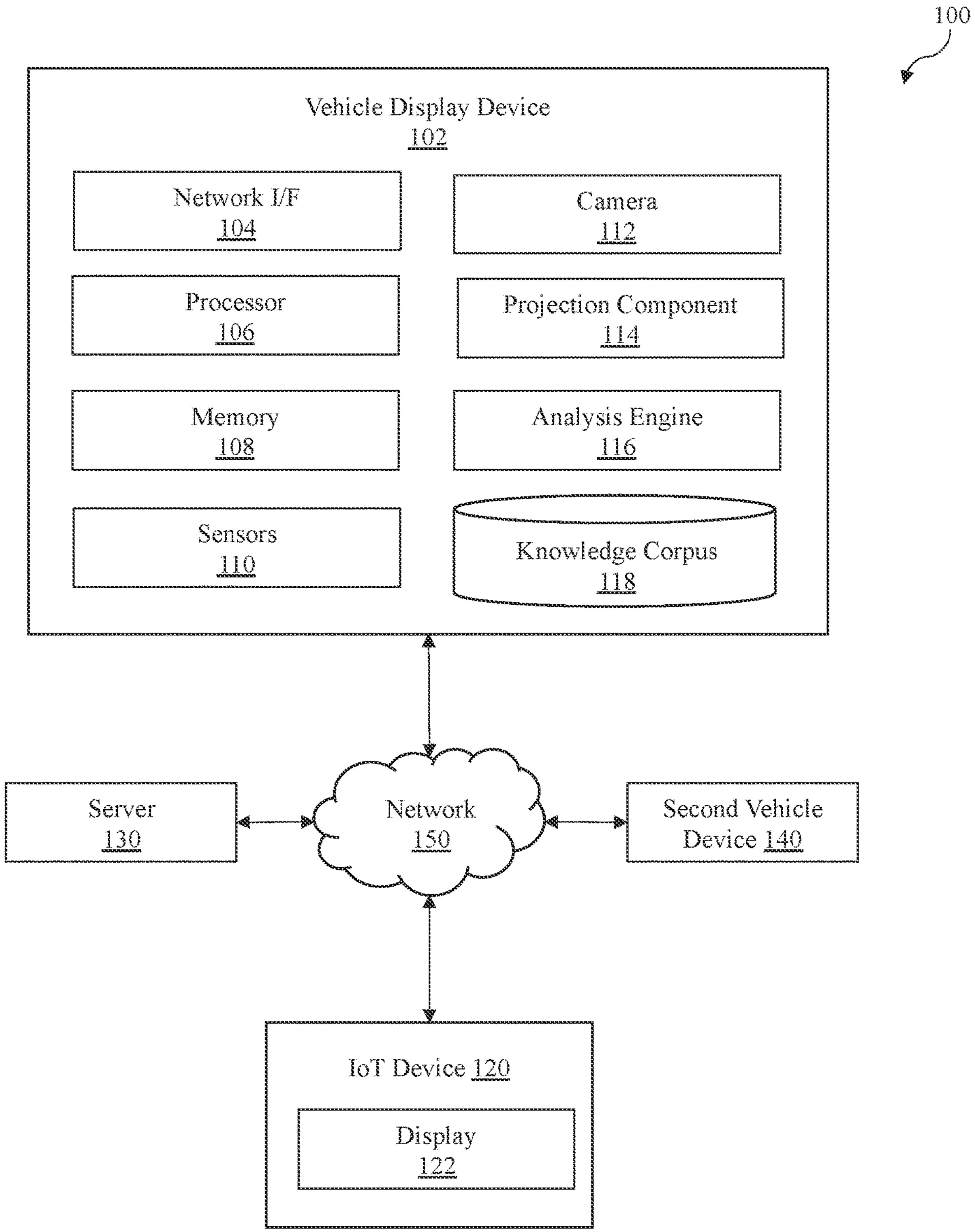
FIG. 1 illustrates an example vehicle information displaying system, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of vehicle safety technology and, more particularly, to displaying vehicle information to a pedestrian using a visual indicator. While the present disclosure is not necessarily limited to such applications, various aspects of the disclosure may be appreciated through a discussion of various examples using this context.

Vehicles (e.g., autonomous and/or manually driven vehicles) can detect various obstacles within their path from a long distance away and can adjust through a driving decision, for both objects that are stationary and/or moving objects. For example, a vehicle may adjust its speed (e.g., slow or stop) or direction while driving on a road based on the presence of a pedestrian in proximity to the vehicle. However, pedestrians may not always follow designated paths (e.g., crosswalks, crossings, etc.) to cross the road. In addition, there can be multiple pedestrians present on the road, and their relative position(s) from the vehicle can also be varied. Because pedestrians may move in an unpredictable manner, a vehicle may be prevented from adequately adjusting its speed or direction to safely pass the pedestrians. Furthermore, pedestrians may be unable to see an approaching vehicle because they are distracted or looking in an opposite direction. For example, pedestrians may not notice the vehicle from a distance, while at the same time, the pedestrian might slowly cross the road, causing the vehicle to abruptly stop. A warning system by which the vehicle can proactively communicate with pedestrians at various distances, so that vehicle does not have to reduce speed or change direction is needed.

Embodiments of the present disclosure include a system, computer-implemented method, and computer program product that are configured to identify contextual situations related to one or more pedestrians in proximity to an approaching vehicle and alert the one or more pedestrians (or users) of the approaching vehicle using a visual indicator (e.g., projection component, a laser projection, hologram, visual display, etc.).

In embodiments, a system may include a vehicle display device that may detect that a vehicle is approaching a pedestrian. In embodiments, the vehicle display device may utilize one or more scanning sensors/modules and/or cameras (Internet of Things (IoT) camera) to determine that the vehicle is approaching the pedestrian. For example, the scanning sensors may determine relative movement of a pedestrian within a roadway in relation to a position of the vehicle. The sensors may be included in the vehicle display device itself, configured as onboard vehicle sensors (e.g., motion detection sensors, onboard camera) and/or stationary sensors disposed in various positions within an environment (e.g., along a roadway). In some embodiments, the relative position of the pedestrian and/or vehicle may be determined from various global position/location devices. For example, the vehicle display device may collect/gather global positioning coordinates from an onboard vehicle system and a smart device (e.g., smart phone, tablet, smart watch, smart sensor, etc.) disposed on or held by the pedestrian. In some embodiments, the vehicle display device may be disposed on a vehicle. In some embodiments, the vehicle display device may be disposed in an environment where vehicles are driven. For example, the vehicle display device may be positioned on a structure (e.g., building, tower, highway overpass, etc.) in proximity of moving vehicles and pedestrians. In this way, the vehicle display device may monitor vehicles and/or pedestrian movement within the environment.

In embodiments, the vehicle display device may determine that the pedestrian is unable to see the approaching vehicle. For example, the vehicle display device may analyze visual data from a camera (e.g., an onboard outward facing camera on the vehicle, IoT camera positioned in proximity to the pedestrian, etc.) to determine that the pedestrian does not see the approaching vehicle. The visual data may include eye-tracking data collected from a camera on the vehicle itself, an eye-tracking camera disposed in the environment, or eye-tracking data collected from a pedestrian device (e.g., smartphone, tablet, IoT camera, etc.). For example, eye-tracking data collected from a pedestrian device may indicate the user is looking at their smartphone while walking across the roadway, rather than in a direction toward the approaching vehicle.

In embodiments, in response to determining that the pedestrian is unable to see the approaching vehicle, the vehicle display device may display an indication that the vehicle is approaching the pedestrian on an object (e.g., surface, static object, etc.) that the pedestrian can currently view. For example, based on analyzing the visual data, the vehicle display device may project a hologram or image comprising vehicle information (e.g., the vehicle's speed, time of arrival, direction of the vehicle, etc.) on the surface of an identified object within a closest proximity of the pedestrian. For example, the vehicle display device may use a visual indicator or projection component (e.g., laser projector, light projector, display device, etc.) to project the indication on to, for example, a tree, a wall, a road surface, a second vehicle, and the like, that is determined to be in the pedestrian's current view. In this way, the pedestrian is warned of the approaching vehicle.

In some embodiments, the vehicle display device is configured to predict if a pedestrian(s) is about to move into a trajectory of a moving vehicle (e.g., cross the road/vehicle lane or is in the process of crossing the road), and accordingly based on the distance of the pedestrian(s), the vehicle display device will proactively project an appropriate message on the road/or object so that the pedestrian(s) can get the information about the vehicle movement in advance. For example, the vehicle display device may use machine learning to analyze historical visual data of pedestrian movements and/or trajectories when moving along a roadway. In embodiments, the machine learning model may identify based on historic image data of pedestrians' movements along a roadway (e.g., analyzing body movements of the pedestrians' extremities, neck, eyes, etc. while moving near traffic and/or roadways) that certain motions and/or movements can be used to predict the likely movement of the pedestrians in relation to the vehicle. Based on the analyzing, the system may be trained to recognize and/or predict positional movements of pedestrians within the roadway. Using the trained machine learning model, allows to system to predict where the best location to display the projected indication would be in relation to the predicted movement of the pedestrian.

In some embodiments, the vehicle display device will determine which object to display the indication (vehicle information) on based on a viewing score related to the pedestrian. For example, the vehicle display device may identify a plurality of objects that the indication can be displayed on which the pedestrian can view (e.g., determined via image recognition analysis), generate a viewing score for each object of the plurality of objects, where the viewing score indicates a value establishing which of the plurality of objects will be best for displaying the indication, and select a first object of the plurality of objects that has the highest viewing score to be the object that the indication is displayed on. For example, a first object in a closest proximity (e.g., 5 ft, 10 ft, etc.) to the user may have a high viewing score, while a second object that is in farther proximity (e.g., 100 ft) may have a low viewing score. The viewing score may also include a second score or a surface score related to the surface of the given object. The surface score may be used to rank which object has a best surface to display the indication on. For example, a round object may be provided a low surface score for projecting the indication on because of the curved surface, while a flat surface would be provided a high surface score because the displayed indication would be adequately displayed on the flat surface. The system may utilize both the viewing score and the surface score to determine the best object to display the indication on. The scores may be weighted on importance. For example, the viewing score may be given a higher weight than the surface score or vice versa. For example, even if a round object may be determined to be in closer proximity to the pedestrian, the low surface score may indicate to the system to ignore the round object for displaying the indication because it would be poorly displayed in such a way that the pedestrian may be unable to view it. In this instance, the system may utilize a next closest object having a higher surface score.

In some embodiments, the indication may include a calculated time of arrival at which the vehicle will arrive at the same location as the pedestrian. This may be based on contextual data such as the relative position of the pedestrian with respect to the speed and distance of approaching vehicle. In this way, projecting the time of arrival of the vehicle allows the pedestrian to adjust their movements based on the arrival time of the vehicle so the pedestrian is no longer in the trajectory of the vehicle (e.g., the pedestrian can exit the roadway safely). In some embodiments, the indication may include an alert (e.g., textual warning) informing the pedestrian to perform an action such as indicating that the pedestrian should walk quickly, exit the roadway, or stop walking, based on the predicted trajectory of the approaching vehicle.

In this way, the vehicle display device is configured to identify the position of different pedestrians on the road, and accordingly identify the optimum position where the projected message can be shown to the pedestrian so that the pedestrians can know about the timing, direction and any instruction is to be followed by the pedestrians.

In some embodiments, the indication may also be sent to and displayed on a display device that the pedestrian can currently view such as a smartphone, an electronic billboard, a tablet, a television screen, and/or a computer screen. For example, the vehicle display device can send the indication over a network to an electronic device such as an electronic billboard that includes a screen in which the indication can be displayed in view of the pedestrian. In this way, the vehicle display device may utilize additional ways to warn the pedestrian that the vehicle is approaching.

In some embodiments, the vehicle display device may determine that the pedestrian is no longer in a trajectory of the approaching vehicle. For example, based on contextual data obtained from the scanning sensors and/or camera, the vehicle display device may determine that the pedestrian is no longer in the path of the approaching vehicle and/or is at a safe distance away from the approaching vehicle. If the system determines that the pedestrian is at a safe distance away from the trajectory of the vehicle, then the vehicle display device may terminate the display of the indication on a given object or display device since it is no longer needed.

In embodiments, the vehicle display device will continually monitor for additional moving objects while the vehicle maintains its trajectory on the road. This allows the vehicle display device to continuously warn any potential pedestrians of the approaching vehicle.

In some embodiments, the vehicle display device is configured to identify other moving objects that are not pedestrians (e.g., using image recognition) such as an animal (e.g., deer, bear, elk, etc.) and perform an automated action. For example, the automated action may include honking the vehicle's horn at the specified distance from the animal, such that the animal will be signaled (alarmed) to move out of the roadway in timely manner. In this way, the vehicle display device may use audible alerts to clear the roadway.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example vehicle information displaying system 100 in which illustrative embodiments of the present disclosure may be implemented. In the illustrated embodiment, the vehicle information displaying system 100 includes vehicle display device 102 that is communicatively coupled to IoT device 120, server 130, and second vehicle device 140 via network 150. In embodiments, vehicle display device 102, IoT device 120, second vehicle device 140, and server 130 may be configured as any type of computer system and may be substantially similar to computer system 501 of FIG. 5. For example, vehicle display device 102 and second vehicle device 140 may be configured as onboard computing systems within a first vehicle and second vehicle, respectively, while IoT device 120 may be configured as a smartphone or tablet held by a user/pedestrian or a smart premises device capable of displaying/projecting vehicle information to the pedestrian. In some embodiments, vehicle display device 102 may be locally operated on any type of vehicle (e.g., autonomous vehicle, manually driven vehicle, car, plane, truck, and the like. In some embodiments, vehicle display device 102 may be located at a static position. For example, the vehicle display device 102 may be position on a building where traffic and/or pedestrians can be observed.

In some embodiments, vehicle information displaying system 100 may be configured as an IBM IoT Connected Vehicle Insights® system (IBM IoT Connected Vehicle Insights® based trademarks and logos are trademarks or registered trademarks of International Business Machines Corporation and/or its affiliates). In some embodiments, vehicle information displaying system 100 may be configured as computing environment 600 as described in FIG. 6.

In embodiments, network 150 may be any type of communication network, such as a wireless network, edge computing network, a cloud computing network, or any combination thereof (e.g., hybrid cloud network/environment). Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), an Internet, or an intranet. In certain embodiments, the various systems may be local to each other, and communicate via any appropriate local communication medium. For example, vehicle display device 102 may communicate with IoT device 120, server 130, and second vehicle device 140 using a WAN, one or more hardwire connections (e.g., an Ethernet cable), and/or wireless communication networks. In some embodiments, the various systems may be communicatively coupled using a combination of one or more networks and/or one or more local connections. For example, vehicle display device 102 may communicate with server 130 through a hardwired connection, while communication between vehicle display device, second vehicle device 140 and IoT device 120 may be through a wireless communication network.

In embodiments, vehicle display device 102 includes processor 106 and memory 108. The vehicle display device 102 may be configured to communicate with IoT device 120, server 130, and second vehicle device 140 through an internal or external network interface 104. The network interface 104 may be, e.g., a modem or a network interface card. The vehicle display device 102 may be equipped with a display or monitor. Additionally, the vehicle display device 102 may include optional input devices (e.g., a keyboard, mouse, scanner, or other input device), and/or any commercially available or custom software (e.g., browser software, communications software, server software, natural language processing/understanding software, search engine and/or web crawling software, filter modules for filtering content based upon predefined parameters, etc.).

In some embodiments, the vehicle display device 102 may include sensors 110, camera 112, projection component 114, analysis engine 116, and knowledge corpus 118.

In embodiments, sensors 110 are configured to generate contextual data (e.g., location data, movement data, speed data, distance data, etc.) related to a vehicle with respect to one or more objects (e.g., users/pedestrian, animals, structures) within a proximity of the vehicle. For example, the sensors 110 may include various motion and/or object detection sensors that are configured to detect any object movement within a proximity of a vehicle. For example, the motion sensors may be able to detect that one or more pedestrians are in a roadway at a distance of 1 km ahead of the vehicle. In some embodiments, the vehicle display device 102 may collect contextual data from second vehicle device 140. For example, vehicle display device 102 may be disposed on a first vehicle and collect sensor data from second vehicle device 140 which is disposed on a second vehicle. For example, the second vehicle may be in proximity to a pedestrian and send sensor data to the vehicle display device 102 on the first vehicle, such that the additional contextual/sensor data from the second vehicle device 140 may be used to make displaying decisions related to the first vehicle.

In embodiments, camera 112 is configured to generate visual data related to the one or more objects detected by the sensors. Analysis engine 116 may analyze (e.g., using image recognition) the visual data generated by the camera 112 to determine what a given object is. For example, the analysis engine 116 may determine that a moving object is a pedestrian. In some embodiments, the analysis engine 116 may utilize eye-tracking algorithms to determine if the pedestrian can see the approaching vehicle. For example, the analysis engine 116 may analyze the visual data generated by camera 112 to determine if the pedestrian can see the approaching vehicle (e.g., whether something is blocking the pedestrian's view or if the pedestrian is not looking toward the direction of the approaching vehicle). In some embodiments, the analysis engine 116 may utilize visual data collected from IoT device 120 to determine if the pedestrian has seen the approaching vehicle (e.g., analyzing eye-tracking data from a smart phone).

In embodiments, the analysis engine 116 may determine based on analyzing the contextual data (e.g., sensor data and/or visual data) related to the pedestrian and the vehicle, a time length that the approaching vehicle will be within a same location as the pedestrian. Once the time length is determined, the vehicle display device 102 will utilize projection component 114 to display an indication (e.g., vehicle information including the time length) that the vehicle is approaching the pedestrian on an object within the pedestrian's view.

In embodiments, the projection component 114 may be any type of visual indicator (e.g., laser projector, light projector, display, hologram, etc.) that can be used to display an indication that the approaching vehicle is coming toward the pedestrian. For example, the projection component 114 may be configured as a laser beam that is configured to display an indication that the vehicle is approaching the pedestrian. The indication may be displayed on another object within the view of the pedestrian, such as a wall, road surface, tree, billboard, another vehicle, etc. The indication may include visual cues that the vehicle is approaching and the expected time length that the vehicle will be at the same location as the pedestrian. In this way, the pedestrian is alerted to the presence of the vehicle and are notified how soon the vehicle will be approaching. This allows the pedestrian who may not be paying attention to the roadway to be warned/alerted of the oncoming vehicle.

In some embodiment, the vehicle display device 102 may communicate directly with IoT device 120 and display an alert on display 122. For example, a pedestrian may be distracted by their smartphone and may not be looking ahead/toward the object where a projected indication may be displayed. In such an instance, the vehicle display device 102 may communicate the indication that the vehicle is approaching to the IoT device 120, where the indication shown on the display 122. In this way, a distracted pedestrian will be alerted on their IoT device 120 that the vehicle is approaching, allowing time to safely leave the roadway. In some embodiments, the vehicle display device 102 may send an audible alert and/or vibration (via haptic sensor) to IoT device 120 to further alert the pedestrian of the approaching vehicle.

In embodiments, knowledge corpus 118 may be used to store, access, and/or update data for making decisions related to vehicles and/or pedestrians. For example, knowledge corpus 118 may store various historic visual data and/or sensor data related to detecting and/or determining the presence of pedestrians or moving objects within trajectories of approaching vehicles. The vehicle display device 102 may use the historic data to train or improve accuracy in displaying vehicle information to pedestrians.

For example, analysis engine 116 may use machine learning algorithms/models to improve detection and displaying capabilities automatically through experience and/or repetition without procedural programming. For example, the analysis engine 116 may use machine learning to analyze historical visual data of pedestrian movements and/or trajectories when moving along a roadway. In embodiments, a machine learning model may be trained to identify based on analyzing historic image data of pedestrians' movements along a roadway (e.g., analyzing body movements of the pedestrians' extremities, neck, eyes, etc. while moving near traffic and/or roadways) that certain motions and/or body movements can be used to predict the likely movement of the pedestrians in relation to the vehicle. Based on the analyzing, the system may be trained to recognize and/or predict positional movements of pedestrians within the roadway. Using the trained machine learning model, allows to system to predict where the best location to display the projected indication would be in relation to the predicted movement of the pedestrian.

In some embodiments, analysis engine 116 will collect and analyze feedback based on where the vehicle information/indication is projected in order to monitor for both positive and negative instances. For example, the analysis engine 116 may use machine learning to analyze feedback indicating that pedestrians typically do not see the displayed indication further than 50 feet away (based on visual data), and use the feedback to automatically train or update the machine learning model to identify objects that are within a distance value that is less than 50 feet away from the pedestrian. In this way, the analysis engine 116 can automatically improve accuracy in alerting pedestrians of approaching vehicles using machine learning algorithms.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an exemplary vehicle information displaying system 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates a vehicle information displaying system 100 with a single vehicle display device 102, a single IoT device 120, a single server 130, a single second vehicle device 140, and a single network 150, suitable computing environments for implementing embodiments of this disclosure may include any number of vehicle information displaying systems, vehicle display devices, IoT devices, servers, and networks. The various modules, systems, and components illustrated in FIG. 1 may exist, if at all, across a plurality of vehicle information displaying systems, vehicle display devices, IoT devices, servers, vehicles, and networks.

Figure 2:
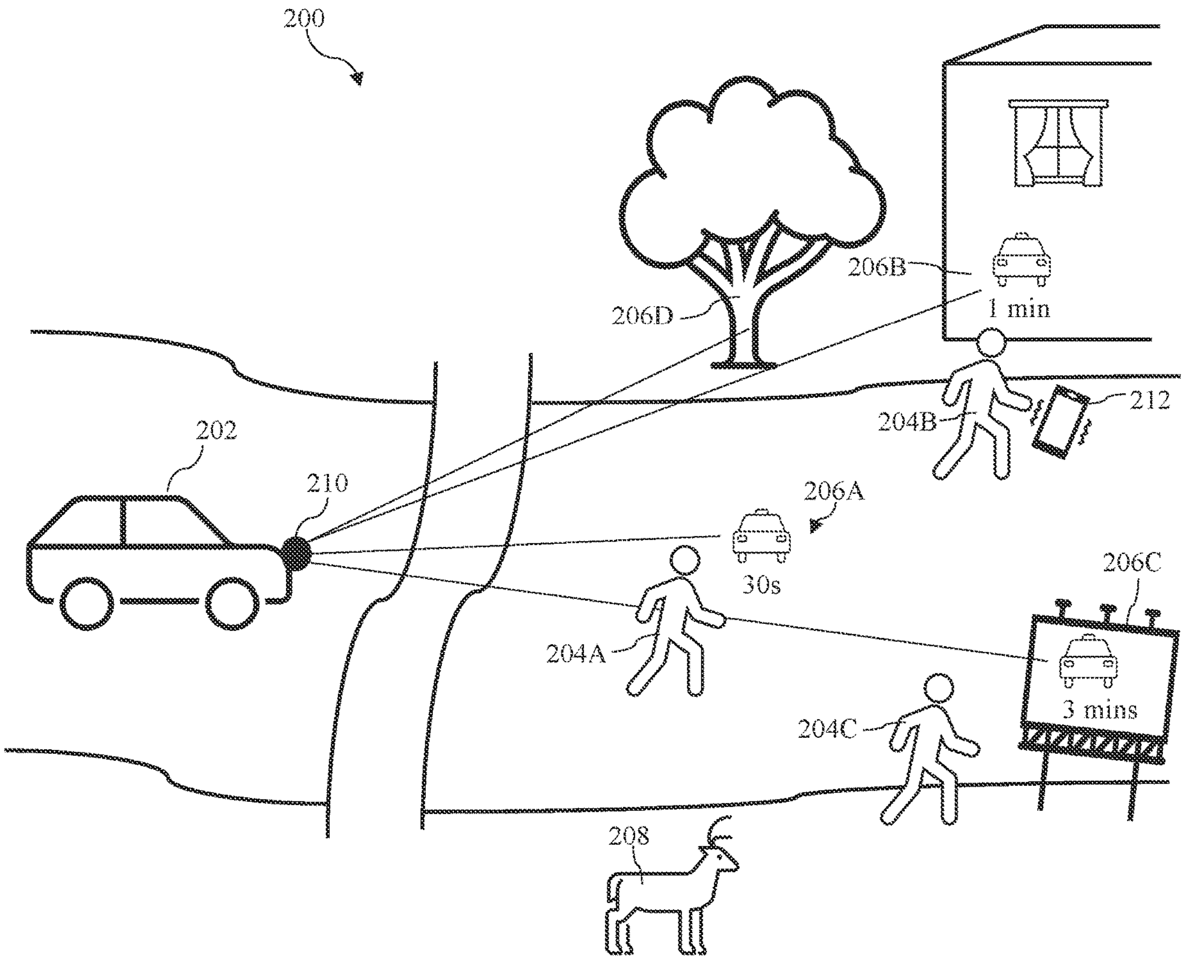
FIG. 2 illustrates an example diagram for displaying vehicle information associated with an approaching vehicle to a pedestrian, in accordance with some embodiments of the present disclosure.

Referring now to FIG. 2, shown is an example diagram 200 for displaying vehicle information of an approaching vehicle to a pedestrian, in accordance with some embodiments of the present disclosure. In the illustrated embodiment, vehicle 202 is approaching pedestrian 204A, pedestrian 204B, and pedestrian 204C (collectively referred to as pedestrians 204). Vehicle display device 210 is configured to collect contextual data (e.g., relative distance between each pedestrian and the vehicle, movement/speed/location of the vehicle in relation to the pedestrian, visual data related to the pedestrian and/or objections within proximity of the vehicle, etc.) associated with the approaching vehicle 202 and one or more pedestrians 204. Using the collected contextual data, vehicle display device 210 will determine information related to the approaching vehicle and display that information on an object within a view of each of the pedestrians using a projection component (e.g., laser projector, light projector, display, etc.).

For example, pedestrian 204A may be walking on a roadway and not looking at the approaching vehicle 202. Vehicle display device 210 may identify (by analyzing visual data collected from one or more cameras) that pedestrian 204A is not looking in a direction toward the approaching vehicle 202. Vehicle display device 210 may utilize the projection component to display an indication that the vehicle 202 is approaching the pedestrian 204A on an object within the view of the pedestrian. Here, the projection component displays the indication on the surface 206A of the roadway. The indication includes a picture of the vehicle 202 and the length of time (30 seconds) until the vehicle 202 will arrive at the pedestrian's location. In some embodiments, the indication may include more or less vehicle information and is not meant to be limiting. For example, the indication may include various alerts or messages warning the pedestrian to move, walk faster, or stop moving. If the pedestrian 204A does not see the displayed indication on the surface of the roadway (based on eye-tracking/visual data), the vehicle display device 210 may display the indication on another object with the view of the pedestrian such as tree 206D. In this way, the vehicle display device 210 will attempt to warn the pedestrian using one or more objects within their view.

In another example, pedestrian 204B may be walking on a roadway and not looking at the approaching vehicle 202. Vehicle display device 210 may identify (by analyzing visual data collected from one or more cameras) that pedestrian 206A is not looking in a direction toward the approaching vehicle 202, rather the pedestrian 204B is looking at their smartphone 212 and/or building 206B. Vehicle display device 210 may utilize projection component 210 to display an indication that a vehicle 202 is approaching the pedestrian 204B on a wall of building 206B within the view of the pedestrian. However, if the pedestrian 204B is also looking at their smartphone 212, the vehicle display device 210 may also send the indication to the smartphone over a network such that the indication is displayed on the screen of the device. In this way, the pedestrian 204B is warned of the approaching vehicle 202 in two different ways based on the contextual data.

In another example, pedestrian 204C may be walking on a side of the roadway and not looking at the approaching vehicle 202. Vehicle display device 210 may identify (by analyzing visual data collected from one or more cameras) that pedestrian 204C is not looking in a direction toward the approaching vehicle 202 and also that pedestrian 204C has not entered the roadway. Vehicle display device 210 may utilize the projection component to display an indication that vehicle 202 is approaching the pedestrian 204C on an object within the view of the pedestrian. Here, the projection component displays the indication on a billboard 206C on the side of the roadway, in view of the pedestrian 204C. The indication includes a picture of the vehicle and the length of time (3 minutes) that the vehicle will arrive at the pedestrian's location. In this example, the indication may include various alerts or messages (not shown) warning the pedestrian 204C not to enter the roadway.

In some embodiments, the vehicle display device 210 may be configured to determine whether moving objects are pedestrians 204 and/or animals 208. If the vehicle display device 210 determines that the moving object is an animal 208 rather than a pedestrian, the vehicle display device 210 may be configured to perform an action to deter the animal from entering and/or being on the roadway. For example, the vehicle display device 210 may be configured to honk the vehicle's horn or project a light or beam toward the animal 208 in an attempt to scare it from the roadway.

In some embodiments, the vehicle display device 210 may be located or disposed on another object rather than the vehicle 202. For example, the vehicle display device 210 may be located on a building or structure near the roadway where it can gather contextual data from both the moving vehicle and/or pedestrian via communicatively coupled sensors/modules and/or IoT cameras over a network.

Figure 3:
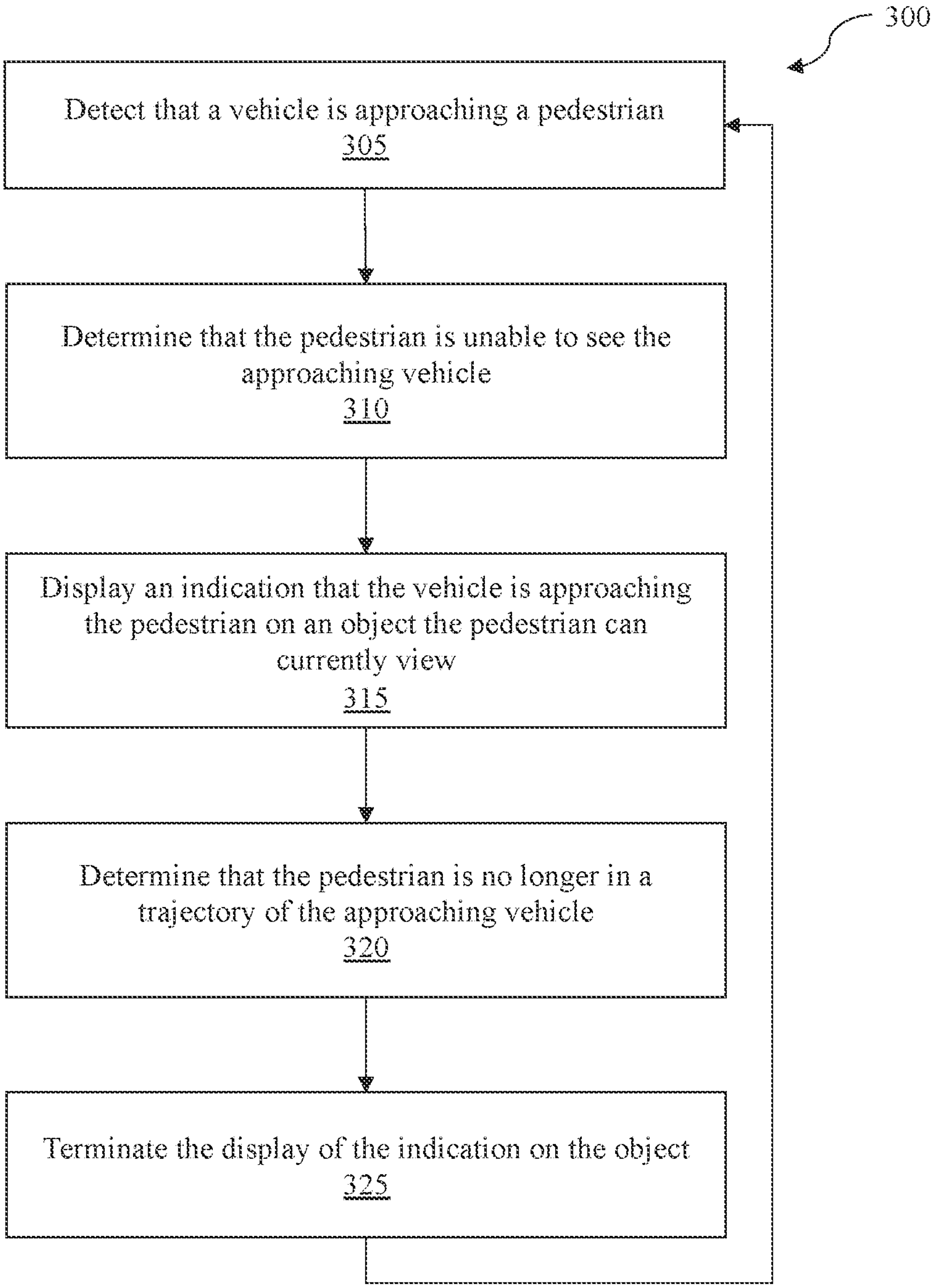
FIG. 3 illustrates an example process for displaying an indication that a vehicle is approaching a pedestrian, in accordance with some embodiments of the present disclosure.

Referring now to FIG. 3, shown is an example process 300 for displaying an indication that a vehicle is approaching a pedestrian, in accordance with some embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. In embodiments, the process 300 may be performed by processor 106 of vehicle display device 102 exemplified in FIG. 1.

In embodiments, the process 300 begins by detecting that a vehicle is approaching a pedestrian. This is illustrated at step 305. In embodiments, the vehicle display device may utilize one or more scanning sensors and/or cameras to determine that the vehicle is approaching the pedestrian. For example, the scanning sensors may determine relative movement of a pedestrian within a roadway in relation to a position of the vehicle. The sensors may be included in the vehicle display device itself, configured as onboard vehicle sensors (e.g., motion detection sensors, onboard camera) and/or stationary sensors disposed in various positions within an environment. In some embodiments, the relative position of the pedestrian and/or vehicle may be determined from various global position/location devices. For example, the vehicle display device may collect/gather global positioning coordinates from an onboard vehicle system and a smart device (e.g., smart phone, tablet, smart watch, smart sensor, etc.) disposed on or held by the pedestrian. In some embodiments, the vehicle display device may be disposed on a vehicle. In some embodiments, the vehicle display device may be disposed in an environment where vehicles are driven. For example, the vehicle display device may be positioned on a structure (e.g., building, tower, highway overpass, etc.) in proximity of moving vehicles and pedestrians.

The process 300 continues by determining that the pedestrian is unable to see the approaching vehicle. This is illustrated at step 310. For example, the vehicle display device may analyze visual data from a camera to determine that the user does not see the approaching vehicle. The visual data may include eye-tracking data collected from a camera on the vehicle itself or eye-tracking data collected from a pedestrian device (e.g., smartphone, tablet, etc.). For example, eye-tracking data collected from a pedestrian device or IoT camera positioned in proximity of the pedestrian may indicate that the pedestrian is looking at their smartphone while walking across the roadway, rather than in a direction toward the approaching vehicle.

The process 300 continues by displaying an indication that the vehicle is approaching the pedestrian on an object the pedestrian can currently view. This is illustrated at step 315. For example, based on analyzing the visual data, the vehicle display device may project an indication that the vehicle is approaching the pedestrian on one or more objects within the pedestrian's view. For example, the vehicle display device may use a projection component (e.g., laser projector, light projector, etc.) to project the indication on to a road surface that is in the pedestrian's current view. In this way, the pedestrian is warned of the approaching vehicle.

In some embodiments, the vehicle display device will determine which object to display the indication based on a viewing score related to the pedestrian. For example, the vehicle display device may identify a plurality of objects that the indication can be displayed on which the pedestrian can view, generating a viewing score for each object of the plurality of objects, wherein the viewing score indicates a value establishing which of the plurality of objects will be best for displaying the indication; and select a first object of the plurality of objects that has the highest viewing score to be the object that the indication is displayed on.

In some embodiments, the indication may include a calculated time of arrival at which the vehicle will arrive at the same location as the pedestrian. This may be based on contextual data such as the relative position of the pedestrian with respect to the speed and distance of approaching vehicle. This allows the pedestrian to adjust their movements based on the arrival time of the vehicle such that they can proceed off the roadway safely. In some embodiments, the indication may include an alert informing the pedestrian to perform an action such as indicating that the pedestrian should walk quickly, exit the roadway, or stop walking, based on the trajectory of the approaching vehicle.

In some embodiments, the indication may also be sent to and displayed on a display device that the pedestrian can currently view such as a smartphone, an electronic billboard, a tablet, a television screen, and/or a computer screen. For example, the vehicle display device can send the indication to an electronic device such as an electronic billboard that includes a screen in which the indication can be displayed in view of the pedestrian. In this way, the vehicle display device may utilize additional ways to warn the pedestrian that the vehicle is approaching.

The process 300 continues by determining that the pedestrian is no longer in a trajectory of the approaching vehicle. This is illustrated at step 320. For example, based on contextual data obtain from the scanning sensors and/or camera, the vehicle display device may determine that the pedestrian is no longer in the path of the approaching vehicle and/or is at a safe distance away from the approaching vehicle.

The process 300 continues by terminating the display of the indication on the object. This is illustrated at step 325. For example, because the pedestrian as been determined to be at a safe distance away from the trajectory of the approaching vehicle, the vehicle display device can terminate the displaying of the indication since it is no longer needed.

The process 300 continues by returning to step 305. For example, the vehicle display device will continually monitor for additional moving objects while it maintains its trajectory on the road. This allows the vehicle display device to continuously warn any potential pedestrians of the approaching vehicle.

Figure 4:
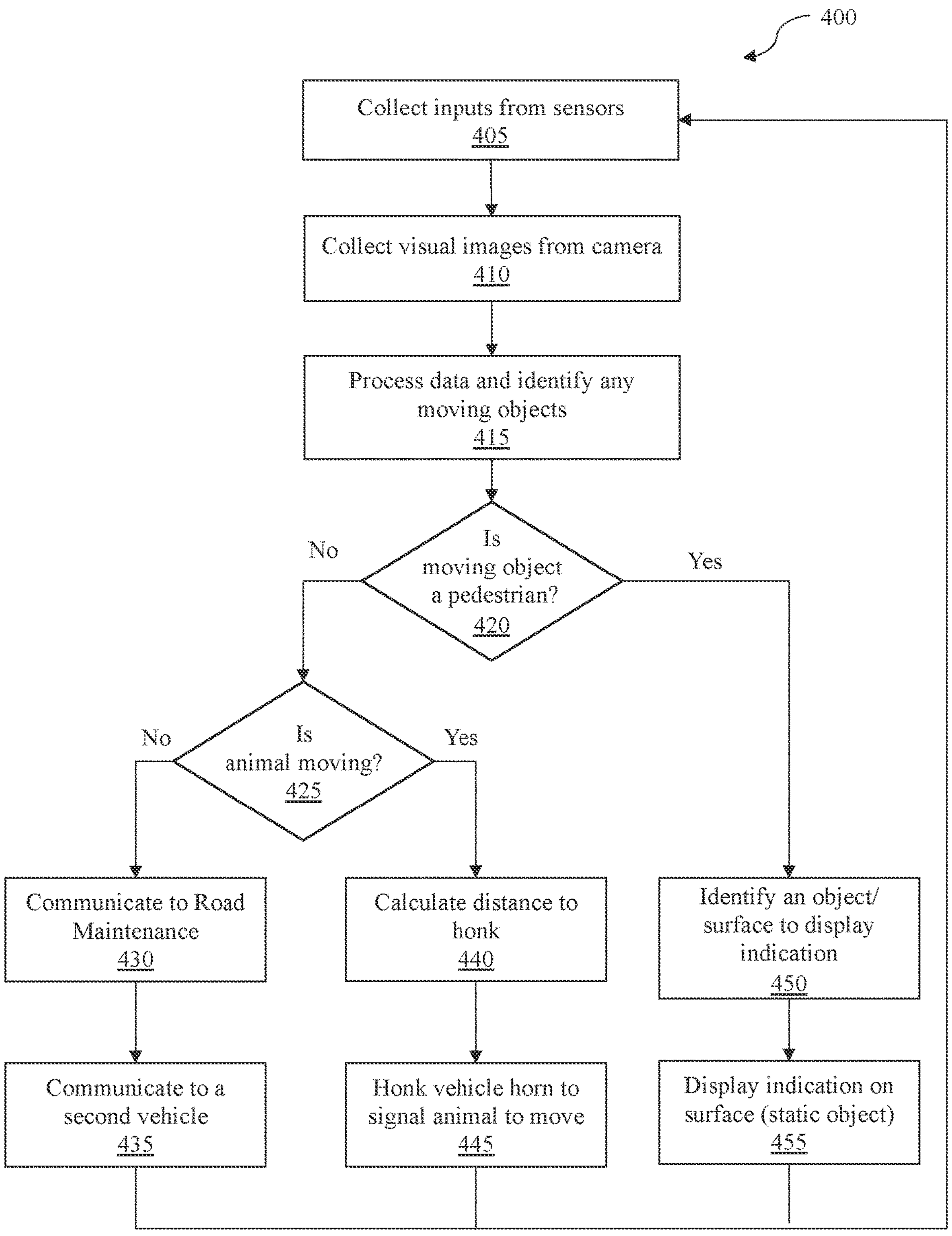
FIG. 4 illustrates an example process for identifying moving objects, in accordance with some embodiments of the present disclosure.

Referring now to FIG. 4, shown is process 400 for identifying moving objects, in accordance with some embodiments of the present disclosure. In some embodiments, process 400 may be in addition to or a subprocess of the example process 300 of FIG. 3. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. In embodiments, the process 400 may be performed by processor 106 of vehicle display device 102 exemplified in FIG. 1.

Process 400 begins by collecting input from one or more sensors on a vehicle. This is illustrated at step 405. For example, vehicle display device will collect various contextual data (e.g., object motion/movement data, vehicle speed data, distance data, object proximity data etc.) from communicatively coupled sensors on the vehicle to determine if there is an object within a current trajectory of the vehicle.

The process 400 continues by collecting visual images/data from one or more communicatively coupled cameras. This is illustrated at step 410. For example, vehicle display device may collect visual data from cameras onboard the moving vehicle and/or visual data from one or more other cameras in proximity to any moving objects. For example, the vehicle display device may be configured to collect image data from IoT cameras within a proximity of the trajectory of the vehicle (e.g., traffic cameras, trail cameras, second vehicle device cameras).

The process 400 continues by processing the contextual data (e.g., input from sensors, image data, etc.) to identify one or more moving objects within the trajectory of the vehicle. This is illustrated at step 415. For example, the vehicle display device may process the contextual data and determine that an object has been detected moving on a roadway that the vehicle is traveling on.

The process 400 continues by determining if the moving object is a pedestrian or an animal. This is illustrated at step 420. Identification of pedestrians and/or animals may be performed by analyzing visual data using image recognition algorithms. If "Yes" at step 420, the process 400 continues by identifying a static object/surface to display an indication that the vehicle is approaching the pedestrian. This is illustrated at step 450.

In some embodiments, the vehicle display device will determine which object to display the indication (vehicle information) on based on a viewing score related to the pedestrian. For example, the vehicle display device may identify a plurality of objects that the indication can be displayed on which the pedestrian can view (e.g., determined via image recognition analysis), generate a viewing score for each object of the plurality of objects, where the viewing score indicates a value establishing which of the plurality of objects will be best for displaying the indication, and select a first object of the plurality of objects that has the highest viewing score to be the object that the indication is displayed on. For example, a first object in a closest proximity (e.g., 20 ft) to the user may have a high viewing score, while a second object that is in far proximity (e.g., 200 ft) may have a low viewing score. The viewing score may also include a second score or a surface score related to the surface of the given object. The surface score may be used to rank which object has a best surface to display the indication. For example, a round object may be provided a low surface score for projecting the indication on because of the curved surface, while a flat surface would be provided a high surface score because the displayed indication would be adequately displayed on the flat surface. The system may utilize both the viewing score and the surface score to determine the best object to display the indication on. The scores may be weighted on importance. For example, the viewing score may be given a higher weight than the surface score or vice versa.

Once the static object/surface is identified, the vehicle display device will display the indication on the surface of the static object. This is illustrated at step 455. The indication may be displayed on the surface/static object by using a projection component such as a laser projector.

Returning to step 420, if "No" then the process 400 continues to step 425. At step 425, the vehicle display device determines if the animal is moving. If "Yes" at step 425, then the process 400 continues by calculating a distance or proximity to the animal at which the vehicle will automatically honk its horn to signal the animal to move away form the trajectory of the vehicle or roadway. This is illustrated at step 440. The process 400 continues by automatically honking the horn when the vehicle is within the calculated distance/proximity to the animal (so the animal will hear the horn), such that the honking signals the animal to move. This is illustrated at step 445.

Returning to step 425, if "No," then the process 400 continues by automatically communicating to a road maintenance service that the animal is on the road. This is illustrated at step 430. For example, the animal may have been hit by a car subsequently to being detected as a moving object. In such an instance, a maintenance crew may be alerted to clear the roadway of the hazard. In some embodiments, the process 400 continues by communicating that the animal is in the road to second vehicle/second vehicle device. This is illustrated at step 435. In this way, other vehicles are warned that there may be a hazard in the road. This will allow the vehicle to reduce speed or adjust driving pattern based on road condition.

In embodiments, after one of steps 435, 445, and/or 455, the process 400 returns to step 405 to continually collect inputs for additional moving objects that may be in the trajectory of the vehicle.

Figure 5:
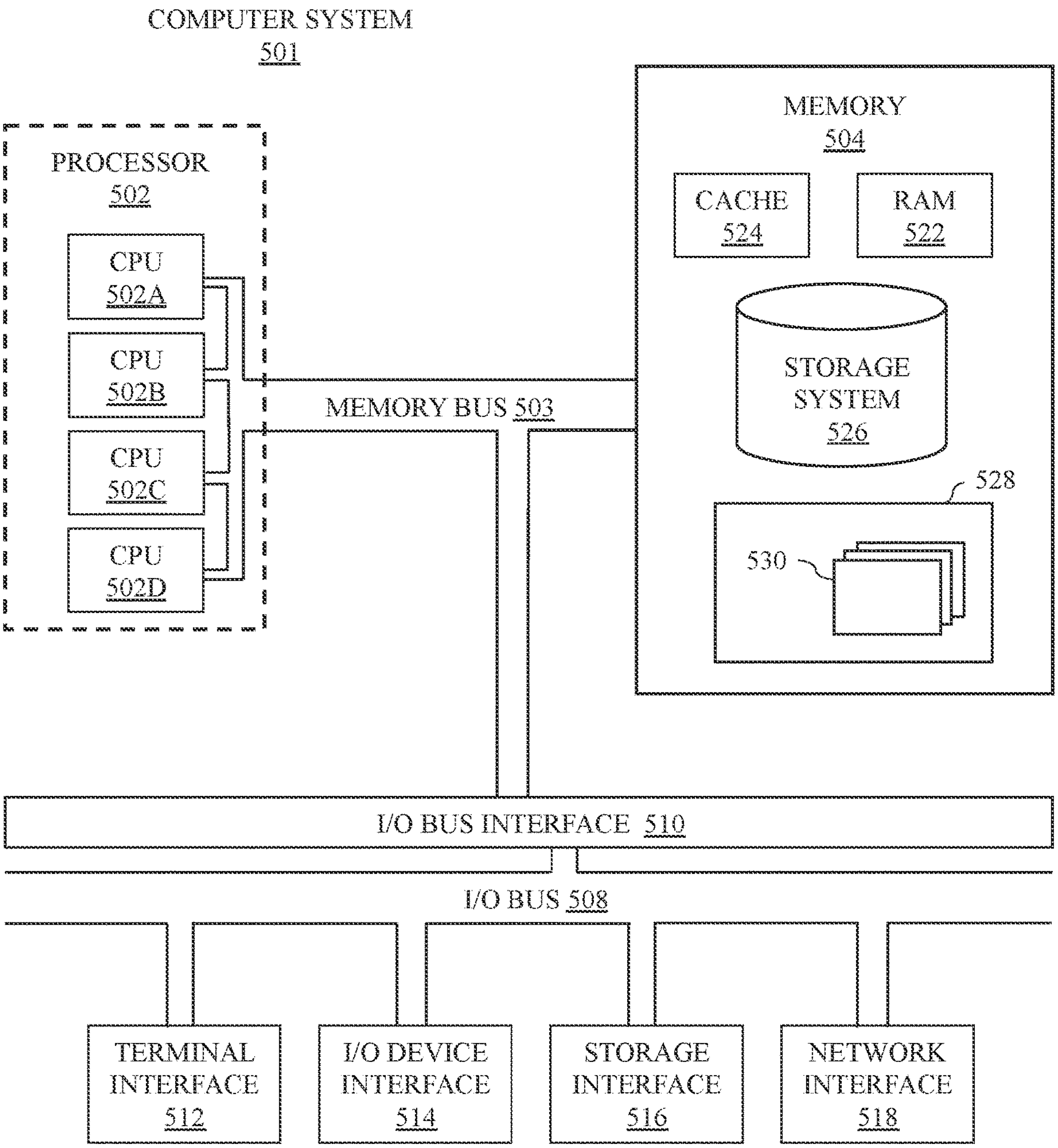
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache. In some embodiments, a processor can include at least one or more of, a memory controller, and/or storage controller. In some embodiments, the CPU can execute the processes included herein (e.g., process 300 and 400 as described in FIG. 3 and FIG. 4, respectively). In some embodiments, the computer system 501 may be configured as vehicle information displaying system 100 of FIG. 1.

System memory subsystem 504 may include computer system readable media in the form of volatile memory, such as random-access memory (RAM) 522 or cache memory 524. Computer system 501 may further include other removable/non-removable, volatile/non-volatile computer system data storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 504 can include flash memory, e.g., a flash memory stick drive or a flash drive. Memory devices can be connected to memory bus 503 by one or more data media interfaces. The memory subsystem 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single units, the computer system 501 may, in some embodiments, contain multiple I/O bus interfaces 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory subsystem 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 528 and/or program modules 530 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
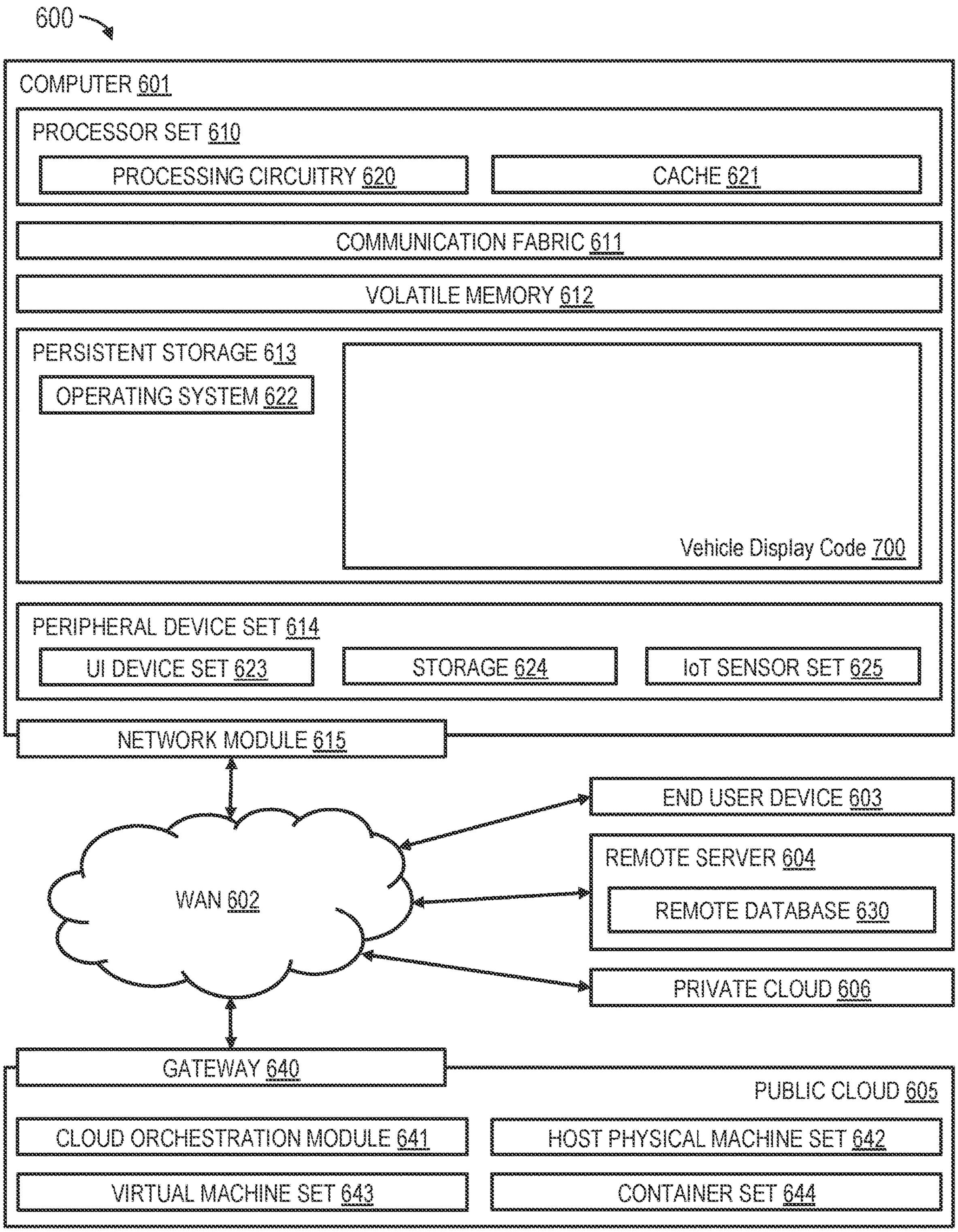
FIG. 6 depicts a schematic diagram of a computing environment for executing program code related to the methods disclosed herein and for displaying vehicle information to a pedestrian using a visual indicator, according to at least one embodiment.

Embodiments of the present disclosure may be implemented together with virtually any type of computer, regardless of the platform is suitable for storing and/or executing program code. FIG. 6 shows, as an example, a computing environment 600 (e.g., cloud computing system) suitable for executing program code related to the methods disclosed herein and for circuit design automation. In some embodiments, the computing environment 600 may be the same as or an implementation of the vehicle information displaying system 100 of FIG. 1.

Computing environment 600 contains an example of an environment for the execution of at least some of the computer code involved in performing the inventive methods, such as vehicle display code 700. The vehicle display code 700 may be a code-based implementation of the vehicle information displaying system 100.

In addition to vehicle display code 700, computing environment 600 includes, for example, a computer 601, a wide area network (WAN) 602, an end user device (EUD) 603, a remote server 604, a public cloud 605, and a private cloud 606. In this embodiment, the computer 601 includes a processor set 610 (including processing circuitry 620 and a cache 621), a communication fabric 611, a volatile memory 612, a persistent storage 613 (including operating a system 622 and the vehicle display code 700, as identified above), a peripheral device set 614 (including a user interface (UI) device set 623, storage 624, and an Internet of Things (IoT) sensor set 625), and a network module 615. The remote server 604 includes a remote database 630. The public cloud 605 includes a gateway 640, a cloud orchestration module 641, a host physical machine set 642, a virtual machine set 643, and a container set 644.

The computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 630. As is well understood in the art of computer technology, and depending upon the technology, performance of a computer-implemented method may be distributed among multiple computers and/or between multiple locations. On the other hand, in this presentation of the computing environment 600, detailed discussion is focused on a single computer, specifically the computer 601, to keep the presentation as simple as possible. The computer 601 may be located in a cloud, even though it is not shown in a cloud in FIG. 1. On the other hand, the computer 601 is not required to be in a cloud except to any extent as may be affirmatively indicated.

The processor set 610 includes one, or more, computer processors of any type now known or to be developed in the future. The processing circuitry 620 may be distributed over multiple packages, for example, multiple, coordinated integrated circuit chips. The processing circuitry 620 may implement multiple processor threads and/or multiple processor cores. The cache 621 is memory that is located in the processor chip package(s) and is typically used for data or code that should be available for rapid access by the threads or cores running on the processor set 610. Cache memories are typically organized into multiple levels depending upon relative proximity to the processing circuitry. Alternatively, some, or all, of the cache for the processor set may be located "off chip." In some computing environments, the processor set 610 may be designed for working with qubits and performing quantum computing.

Computer readable program instructions are typically loaded onto the computer 601 to cause a series of operational steps to be performed by the processor set 610 of the computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 621 and the other storage media discussed below. The program instructions, and associated data, are accessed by the processor set 610 to control and direct performance of the inventive methods. In the computing environment 600, at least some of the instructions for performing the inventive methods may be stored in the vehicle display code 700 in the persistent storage 613.

The communication fabric 611 is the signal conduction path that allows the various components of the computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 612 is any type of volatile memory now known or to be developed in the future. Examples include dynamic type random access memory (RAM) or static type RAM. Typically, the volatile memory 612 is characterized by random access, but this is not required unless affirmatively indicated. In the computer 601, the volatile memory 612 is located in a single package and is internal to the computer 601, but, alternatively or additionally, the volatile memory may be distributed over multiple packages and/or located externally with respect to the computer 601.

The persistent storage 613 is any form of non-volatile storage for computers that is now known or to be developed in the future. The non-volatility of this storage means that the stored data is maintained regardless of whether power is being supplied to the computer 601 and/or directly to the persistent storage 613. The persistent storage 613 may be a read only memory (ROM), but typically at least a portion of the persistent storage allows writing of data, deletion of data and re-writing of data. Some familiar forms of persistent storage include magnetic disks and solid state storage devices. The operating system 622 may take several forms, such as various known proprietary operating systems or open source Portable Operating System Interface-type operating systems that employ a kernel. The code included in the vehicle display code 600 typically includes at least some of the computer code involved in performing the inventive methods.

The peripheral device set 614 includes the set of peripheral devices of the computer 601. Data communication connections between the peripheral devices and the other components of the computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 623 may include components such as a display screen, speaker, microphone, wearable devices (such as goggles and smart watches), keyboard, mouse, printer, touchpad, game controllers, and haptic devices. The storage 624 is external storage, such as an external hard drive, or insertable storage, such as an SD card. The storage 624 may be persistent and/or volatile. In some embodiments, the storage 624 may take the form of a quantum computing storage device for storing data in the form of qubits. In embodiments where the computer 601 is required to have a large amount of storage (for example, where the computer 601 locally stores and manages a large database) then this storage may be provided by peripheral storage devices designed for storing very large amounts of data, such as a storage area network (SAN) that is shared by multiple, geographically distributed computers. The IoT sensor set 625 is made up of sensors that can be used in Internet of Things applications. For example, one sensor may be a thermometer and another sensor may be a motion detector.

The network module 615 is the collection of computer software, hardware, and firmware that allows the computer 601 to communicate with other computers through the WAN 602. The network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 615 are performed on the same physical hardware device. In other embodiments (for example, embodiments that utilize software-defined networking (SDN)), the control functions and the forwarding functions of the network module 615 are performed on physically separate devices, such that the control functions manage several different network hardware devices. Computer readable program instructions for performing the inventive methods can typically be downloaded to the computer 601 from an external computer or external storage device through a network adapter card or network interface included in the network module 615.

The WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 603 is any computer system that is used and controlled by an end user (for example, a customer of an enterprise that operates the computer 601), and may take any of the forms discussed above in connection with the computer 601. The EUD 603 typically receives helpful and useful data from the operations of the computer 601. For example, in a hypothetical case where the computer 601 is designed to provide a recommendation to an end user, this recommendation would typically be communicated from the network module 615 of the computer 601 through the WAN 602 to the EUD 603. In this way, the EUD 603 can display, or otherwise present, the recommendation to an end user. In some embodiments, the EUD 603 may be a client device, such as thin client, heavy client, mainframe computer, desktop computer and so on.

The remote server 604 is any computer system that serves at least some data and/or functionality to the computer 601. The remote server 604 may be controlled and used by the same entity that operates computer 601. The remote server 604 represents the machine(s) that collect and store helpful and useful data for use by other computers, such as the computer 601. For example, in a hypothetical case where the computer 601 is designed and programmed to provide a recommendation based on historical data, then this historical data may be provided to the computer 601 from the remote database 630 of the remote server 604.

The public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 605 is performed by the computer hardware and/or software of the cloud orchestration module 641. The computing resources provided by the public cloud 605 are typically implemented by virtual computing environments that run on various computers making up the computers of the host physical machine set 642, which is the universe of physical computers in and/or available to the public cloud 605. The virtual computing environments (VCEs) typically take the form of virtual machines from the virtual machine set 643 and/or containers from the container set 644. It is understood that these VCEs may be stored as images and may be transferred among and between the various physical machine hosts, either as images or after instantiation of the VCE. The cloud orchestration module 641 manages the transfer and storage of images, deploys new instantiations of VCEs and manages active instantiations of VCE deployments. The gateway 640 is the collection of computer software, hardware, and firmware that allows the public cloud 605 to communicate through the WAN 602.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 606 is similar to the public cloud 605, except that the computing resources are only available for use by a single enterprise. While the private cloud 606 is depicted as being in communication with the WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 605 and the private cloud 606 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some embodiments, one or more of the operating system 622 and the vehicle display code 700 may be implemented as service models. The service models may include software as a service (SaaS), platform as a service (PaaS), and infrastructure as a service (IaaS). In SaaS, the capability provided to the consumer is to use the provider’s applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will further be understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

For example, without limitation, “at least one of item A, item B, or item C” may include item A, item A and item B, or item B. This example also may include item A, item B, and item C or item B and item C. Of course, any combinations of these items can be present. In some illustrative examples, “at least one of” can be, for example, without limitation, two of item A; one of item B; and ten of item C; four of item B and seven of item C; or other suitable combinations.

Different instances of the word “embodiment” as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:

detecting, based on an analysis of image data generated by one or more sensors disposed on a vehicle, that the vehicle is approaching a pedestrian;

analyzing, using eye-tracking algorithms, the image data to determine eye direction of the pedestrian with respect to the vehicle;

determining, based on the eye direction of the pedestrian, that the pedestrian is unable to see the approaching vehicle;

identifying, based on image recognition analysis of the image data and the eye direction of the pedestrian, a plurality of objects within a view of the pedestrian;

generating, based on the identifying, a viewing score for each object of the plurality of objects, wherein the viewing score is representative of a closest proximity value for each object with respect to the view of the pedestrian;

selecting a first object of the plurality of objects that has the highest viewing score; and displaying, by a visual indicator disposed on the vehicle, a visual indication that the vehicle is approaching the pedestrian on the first object.

2. The computer-implemented method of claim 1, wherein the visual indication is displayed using a laser beam projected on to the first object.

3. The computer-implemented method of claim 2, wherein the first object is selected from a group of objects consisting of:

a road;

a wall;

a tree; and a second vehicle.

4. The computer-implemented method of claim 1, wherein the visual indication is displayed on a display device that the pedestrian can currently view.

5. The computer-implemented method of claim 4, wherein the display device is selected from a group of display devices consisting of:

a smartphone;

an electronic billboard;

a tablet;

a television screen; and a computer screen.

6. The computer-implemented method of claim 1, further comprising:

identifying a relative position of the pedestrian with respect to the approaching vehicle;

calculating a time of arrival at which the vehicle will arrive at a same location as the pedestrian, wherein the displayed visual indication includes the calculated time of arrival.

7. The computer-implemented method of claim 1, wherein the visual indication includes an alert informing the pedestrian to perform an action.

8. The computer-implemented method of claim 7, wherein the alert is selected from a group of alerts consisting of: warning the pedestrian to walk quickly; warning the pedestrian to exit a roadway; and warning the pedestrian to stop moving.

9. The computer-implemented method of claim 1, wherein detecting that the vehicle is approaching the pedestrian is performed using one or more scanning sensors.

10. The computer-implemented method of claim 1, further comprising:

determining that the pedestrian is no longer in a trajectory of the approaching vehicle; and terminating the display of the visual indication on the first object.

11. A system comprising:

a processor; and a computer-readable storage medium communicatively coupled to the processor and storing program instructions which, when executed by the processor, cause the processor to perform a method comprising:

detecting, based on an analysis of image data generated by one or more sensors disposed on a vehicle, that the vehicle is approaching a pedestrian;

analyzing, using eye-tracking algorithms, the image data to determine eye direction of the pedestrian with respect to the vehicle;

determining, based on the eye direction of the pedestrian, that the pedestrian is unable to see the approaching vehicle;

identifying, based on image recognition analysis of the image data and the eye direction of the pedestrian, a plurality of objects within a view of the pedestrian;

generating, based on the identifying, a viewing score for each object of the plurality of objects, wherein the viewing score is representative of a closest proximity value for each object with respect to the view of the pedestrian;

selecting a first object of the plurality of objects that has the highest viewing score; and displaying, by a visual indicator disposed on the vehicle, a visual indication that the vehicle is approaching the pedestrian on the first object.

12. The system of claim 11, wherein the visual indication is displayed using a laser beam projected from the vehicle on to the first object.

13. The system of claim 11, wherein the method performed by the processor further comprises:

identifying a relative position of the pedestrian with respect to the approaching vehicle; and calculating a time of arrival at which the vehicle will arrive at a same location as the pedestrian, wherein the displayed visual indication includes the calculated time of arrival.

14. A non-transitory computer-readable storage medium having program instructions embodied therewith, the program instructions executable by a processor to cause the processor to perform a method comprising:

detecting, based on an analysis of image data generated by one or more sensors disposed on a vehicle, that the vehicle is approaching a pedestrian;

analyzing, using eye-tracking algorithms, the image data to determine eye direction of the pedestrian with respect to the vehicle;

determining, based on the eye direction of the pedestrian, that the pedestrian is unable to see the approaching vehicle;

identifying, based on image recognition analysis of the image data and the eye direction of the pedestrian, a plurality of objects within a view of the pedestrian;

generating, based on the identifying, a viewing score for each object of the plurality of objects, wherein the viewing score is representative of a closest proximity value for each object with respect to the view of the pedestrian;

selecting a first object of the plurality of objects that has the highest viewing score; and displaying, by a visual indicator disposed on the vehicle, a visual indication that the vehicle is approaching the pedestrian on the first object.

15. The non-transitory computer-readable storage medium of claim 14, wherein the visual indication is displayed using a laser beam projected from the vehicle on to the first object.

16. The non-transitory computer-readable storage medium of claim 14, wherein the method performed by the processor further comprises:

identifying a relative position of the pedestrian with respect to the approaching vehicle; and calculating a time of arrival at which the vehicle will arrive at a same location as the pedestrian, wherein the displayed visual indication includes the calculated time of arrival.

* * * * *